(12) United States Patent
Culleton et al.

(10) Patent No.: US 9,931,988 B2
(45) Date of Patent: Apr. 3, 2018

(54) DEVICE FOR SECURING ITEMS IN A CARGO AREA OF A CAR

(71) Applicants: Michael Culleton, Dublin (IE); Ben Millett, Boyle (IE); Alan Harrison, Ballina (IE)

(72) Inventors: Michael Culleton, Dublin (IE); Ben Millett, Boyle (IE); Alan Harrison, Ballina (IE)

( * ) Notice: Subject to any disclaimer, the term of this patent is extended or adjusted under 35 U.S.C. 154(b) by 0 days.

(21) Appl. No.: 14/194,625

(22) Filed: Feb. 28, 2014

(65) Prior Publication Data

US 2014/0246466 A1     Sep. 4, 2014

Related U.S. Application Data

(60) Provisional application No. 61/771,125, filed on Mar. 1, 2013.

(51) Int. Cl.
| | |
|---|---|
| *B63B 25/24* | (2006.01) |
| *B60R 5/04* | (2006.01) |
| *B60R 7/08* | (2006.01) |
| *B60R 7/02* | (2006.01) |

(52) U.S. Cl.
CPC ............... *B60R 5/04* (2013.01); *B60R 7/02* (2013.01); *B60R 7/08* (2013.01)

(58) Field of Classification Search
CPC .... B60R 7/02; B60R 7/04; B60R 7/05; B60R 7/08
USPC .......................... 224/539, 555; 248/166, 500
See application file for complete search history.

(56) References Cited

U.S. PATENT DOCUMENTS

| | | | | |
|---|---|---|---|---|
| 491,091 | A * | 2/1893 | Drake | 122/510 |
| 939,368 | A * | 11/1909 | Withem | F22B 37/202 |
| | | | | 122/510 |
| 1,396,910 | A * | 11/1921 | Annable | 40/642.02 |
| 1,598,467 | A * | 8/1926 | Weeks | 211/43 |
| D73,215 | S * | 8/1927 | Wessel | D19/34.1 |
| 2,031,698 | A * | 2/1936 | Fanzoi | 211/43 |
| 3,269,558 | A * | 8/1966 | Hess | A47B 57/58 |
| | | | | 211/184 |
| 3,385,450 | A * | 5/1968 | Nadler et al. | 211/42 |
| 4,189,056 | A * | 2/1980 | Majewski | B60R 7/02 |
| | | | | 211/181.1 |
| 4,393,568 | A * | 7/1983 | Navarro | 29/432 |
| 4,637,632 | A * | 1/1987 | Rubash et al. | 281/45 |

(Continued)

*Primary Examiner* — Nathan J Newhouse
*Assistant Examiner* — Lester L Vanterpool
(74) *Attorney, Agent, or Firm* — Edwin Tarver (57) ABSTRACT

A freestanding unit for securing loose items within the cargo area of a vehicle by propping items against a side wall of the cargo area includes a vertical wall section and bottom wall forming an overall L shaped cross section reinforced by molded ribs. The freestanding wall unit is secured to the carpeted floor of the vehicle's cargo area using continuous strips of hook and loop material. Two handles, situated one on either end of the vertical wall allow ease of use when removing or repositioning the freestanding wall unit within the cargo area. The handles are positioned at either end to provide a constant and steady peeling effect facilitated by the continuous hook and loop strips when removing the unit from a carpeted surface. The unit may be constructed as a solid one piece molded plastic part utilizing a tough and durable plastic.

8 Claims, 7 Drawing Sheets

(56) References Cited

U.S. PATENT DOCUMENTS

| | | | | |
|---|---|---|---|---|
| 4,718,584 A * | 1/1988 | Schoeny | B60R 7/02 217/12 R |
| 4,725,033 A * | 2/1988 | Zinnecker | B63B 25/28 248/154 |
| 4,746,041 A * | 5/1988 | Cook | B60R 7/02 211/104 |
| 4,842,460 A * | 6/1989 | Schlesch | B60P 7/0892 188/32 |
| D314,399 S * | 2/1991 | Soporowski | D19/34.1 |
| 5,036,988 A * | 8/1991 | Rouire | 211/42 |
| D326,077 S * | 5/1992 | Rana | D12/414 |
| 5,129,612 A * | 7/1992 | Beaupre | B60R 7/02 224/539 |
| D330,502 S * | 10/1992 | Rana | D19/34.1 |
| D336,106 S * | 6/1993 | Goodman et al. | D19/34.1 |
| D336,107 S * | 6/1993 | Goodman et al. | D19/34.1 |
| D341,621 S * | 11/1993 | Evenson | D19/34.1 |
| 5,526,972 A * | 6/1996 | Frazier | B60R 7/02 220/529 |
| D371,506 S * | 7/1996 | Nofziger | D8/354 |
| D375,038 S * | 10/1996 | Trevorrow | D8/354 |
| 5,601,271 A * | 2/1997 | Janowski | B60P 7/0892 248/503 |
| 5,662,305 A * | 9/1997 | Shimamura | A47B 91/00 224/42.33 |
| 5,865,580 A * | 2/1999 | Lawrence | B60P 7/0892 410/117 |
| 6,041,987 A * | 3/2000 | Tickoo | 224/542 |
| 6,073,405 A * | 6/2000 | Kasai et al. | 52/283 |
| 6,138,883 A * | 10/2000 | Jackson | B60R 9/00 224/404 |
| 6,149,040 A * | 11/2000 | Walker | B60R 7/02 224/404 |
| D451,136 S * | 11/2001 | Goodman et al. | D19/34.1 |
| 6,334,539 B1 * | 1/2002 | Jajko et al. | 211/42 |
| D469,802 S * | 2/2003 | Goodman et al. | D19/34.1 |
| D469,803 S * | 2/2003 | Goodman et al. | D19/34.1 |
| 6,702,532 B1 * | 3/2004 | Throener | B60P 7/0892 410/121 |
| 7,306,416 B1 * | 12/2007 | Arico | B60P 7/0892 410/102 |
| 7,455,274 B2 * | 11/2008 | Sutherland | B60R 7/02 248/346.01 |
| 7,533,508 B1 * | 5/2009 | diGirolamo et al. | 52/481.1 |
| 7,665,790 B2 * | 2/2010 | Oino | B60R 7/02 224/539 |
| D611,317 S * | 3/2010 | McGrath | D12/223 |
| 7,828,263 B2 * | 11/2010 | Bennett et al. | 249/219.1 |
| D644,503 S * | 9/2011 | Crane | D8/354 |
| D663,020 S * | 7/2012 | Purnell | D23/386 |
| D678,167 S * | 3/2013 | Frost | D12/223 |
| 2003/0000982 A1 * | 1/2003 | Gehring | B60R 7/02 224/539 |
| 2004/0211805 A1 * | 10/2004 | Victor | B60R 7/02 224/497 |
| 2005/0284906 A1 * | 12/2005 | Potts | B60R 7/02 224/539 |

\* cited by examiner

DEVICE FOR SECURING ITEMS IN A CARGO AREA OF A CAR

This application claims the benefit of the filing date of provision application No. 61/771,125, filed on Mar. 1, 2013.

BACKGROUND

Items held loosely in the cargo area of a car often prove problematic when in transit. Loose items may cause damage or become damaged by moving freely whilst the vehicle is in motion. These items may include, but are not limited to, items that are prone to being damaged, causing damage or creating a mess in the cargo area. They also include heavy items, breakable or fragile items, items of awkward shape, items that may spill their contents. These may include for example potted plants, laptops, wheelchairs, push-chairs, cool-boxes, sports equipment or items (e.g. football, rugby ball, scooters, skateboards etc.), items of shopping (e.g. bottles, tins, foodstuffs, etc.), luggage.

These items if left loose may become damaged or cause damage to other items during transit. The movement of such items within the cargo area may also cause annoyance or anxiety to the driver or passengers of the vehicle.

The devices and products that are available that aim to solve this problem consist of boxes which aim to hold items secure and other products that feature fold up flaps and interior walls that are used to create compartments within the product that can hold items when placed within.

These products are limited to small items or several small items but do not work effectively unless a box or particular compartment is full to the point that there are enough items to prevent other items from moving within that compartment.

The movement of the vehicle can still cause these items to move around within the box or compartmentalized storage unit, or, if movement of the vehicle is sudden enough the box or other storage unit may slide or move around the cargo area also.

The invention therefore is a solid plastic freestanding wall that can secure items against the side wall of a cargo area whilst itself being affixed to the floor of the cargo area.

SUMMARY

The invention is a large, solid, freestanding, plastic 'L' shaped wall which can be affixed to the carpet in a car cargo area and hold loose items securely up against a side wall of the cargo area.

The invention comprises of a solid plastic wall with 'L' shaped cross section. The vertical face of the 'L' provides support for propping items up against, whilst the horizontal face of the 'L' sits on the floor of the cargo area and keeps the unit upright. A supportive molded rib structure is provided, and a series of molded ribs which transfer lateral force exerted on the vertical face of the unit into vertical force acting downwards on the horizontal face of the unit. An anchoring device is included to affix the unit to the ground surface within the cargo area, and a series of two long continuous strips of hook and loop material located on the bottom of the unit which serve to anchor the unit to the carpeted floor within a cargo area.

The strips, by being continuous along the bottom of the unit as opposed to being individual pieces located at various degrees of separation allow smooth removal of the unit from the carpeted floor by way of a 'peeling' motion. This is in differentiation to the sudden, jerky motion that would be experienced when removing the unit if individual pieces of hook and loop fastener were to be used which would cause one end of the unit to suddenly become free when being pulled upwards.

Individual handles are located on either end of the unit. In a preferred embodiment, the individual handles may be grip holes for gripping the unit by hand. These handles are for the ease of lifting the unit and 'peeling' the unit from the carpeted surface. By positioning a handle on either end of the invention as opposed to directly in the middle, as would be found on other products, the user can, with ease, lift one side of the unit, breaking the grip of the hook and loop fastener on the carpet, and continue to steadily peel the unit away from the carpet facilitated by the continuous strips of hook and loop material. This gives a steady and constant peeling effect. If, however, a handle in the middle of the product were to be used this would result in a higher exertion of force being required to break the grip between the hook and loop material and the carpet and would in turn result in a sudden release which could cause harm to the user or to the product.

The invention is intended to be used to simplify stowage of loose items within a cargo area. Items are placed into the cargo area and the invention is then simply placed against the loose items essentially wedging them against the side wall of the cargo area. Only one unit of the invention is required for satisfactory usage with most objects big or small. With such items that are large the invention can be placed parallel against a section of the item to prohibit movement within one axis or diagonally against a corner of the item to prohibit movement of the item within two axis. For small items the invention can be placed diagonally abutting two of the walls of the cargo area to create a small compartment in which items can be placed. This compartment can be adjusted by altering the angle at which the invention is positioned between the cargo area walls to assure a snug fit for the enclosed item. The use of multiple units of the invention in unison is not required for the restraint of any item big or small.

The invention includes also a method of attachment for adding accessories. The accessories include, but are not limited to, elastic straps for holding bottles, add on boxes for storage of plastic shopping bags or essential car accessories that otherwise clutter the cargo area.

In summary, a freestanding apparatus for securing loose items within the cargo area of a vehicle, includes a top wall substantially vertical in orientation bearing a handle, a bottom wall substantially horizontal in orientation, at least one rib perpendicular to the top wall and the bottom wall, extending there between, and an anchoring strip extending the length of the bottom wall, wherein the anchoring strip is disposed on a side of the bottom wall opposite a side to which the rib is anchored, and wherein the handle is located near a side edge of the top wall.

The top wall may include cut-out sections to reducing the weight of the top wall, and includes two handles located near opposite side edges of the top wall, and slots are formed in the top wall adjacent the ribs for anchoring items adjacent the apparatus. The bottom wall is smaller in plan area than the top wall, but the top wall and the bottom wall share a common width. The bottom wall includes two anchoring strips, which may be a hook and loop fastening material, and the anchoring strips are located near opposite edges of the bottom wall.

REFERENCE NUMBERS

1. Freestanding Wall Apparatus
2. Front Wall
3. Molded Plastic Ribs
4. Ground Wall
5. Anchoring Strips
6. Handles
7. Slots
8. Top edge
9. Bottom edge
10. Side edge

DESCRIPTION

Figure 1:
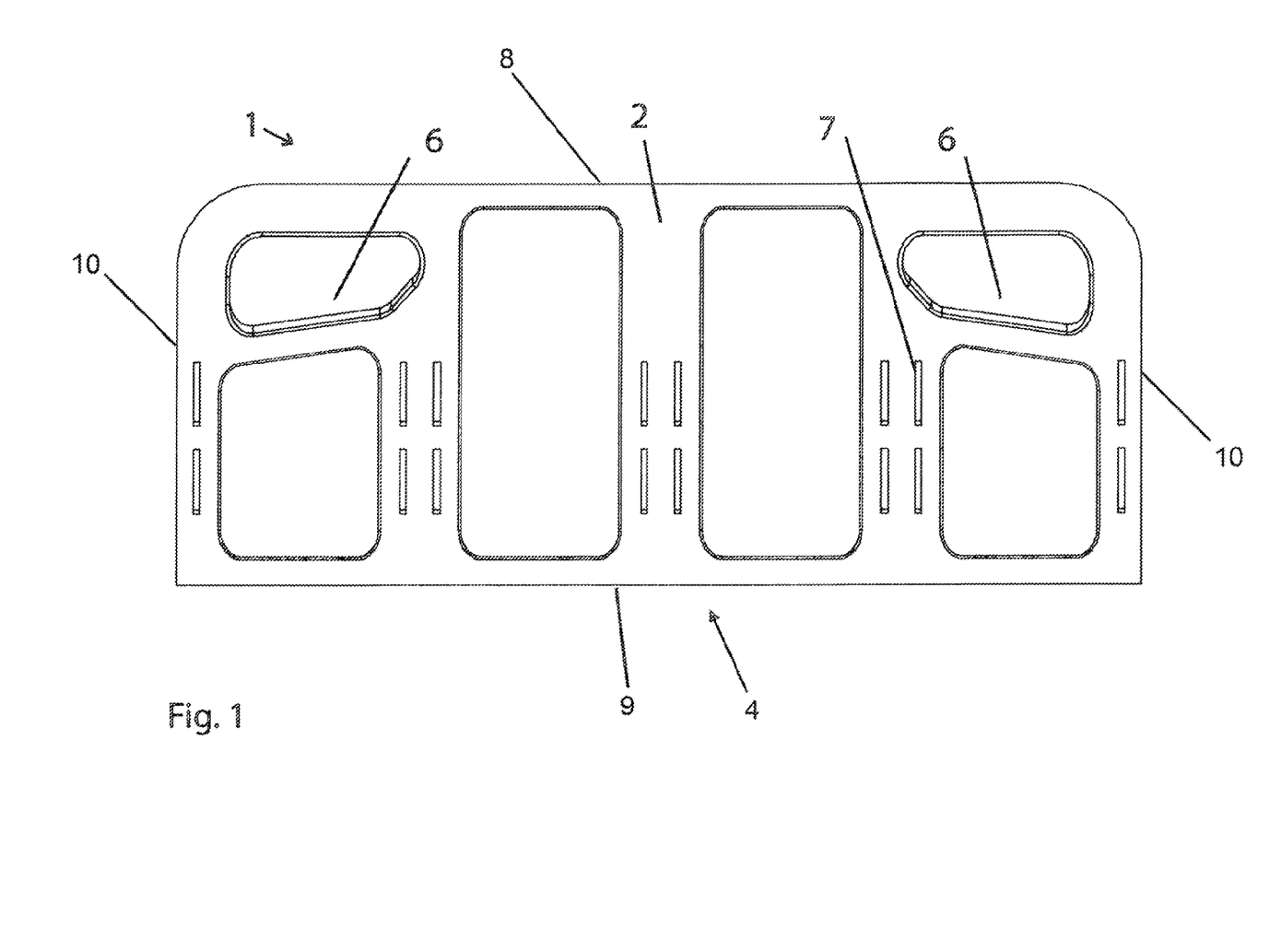
FIG. 1 shows a front elevational view of a device for securing items in a cargo area of a car according to the invention.
Figure 4:
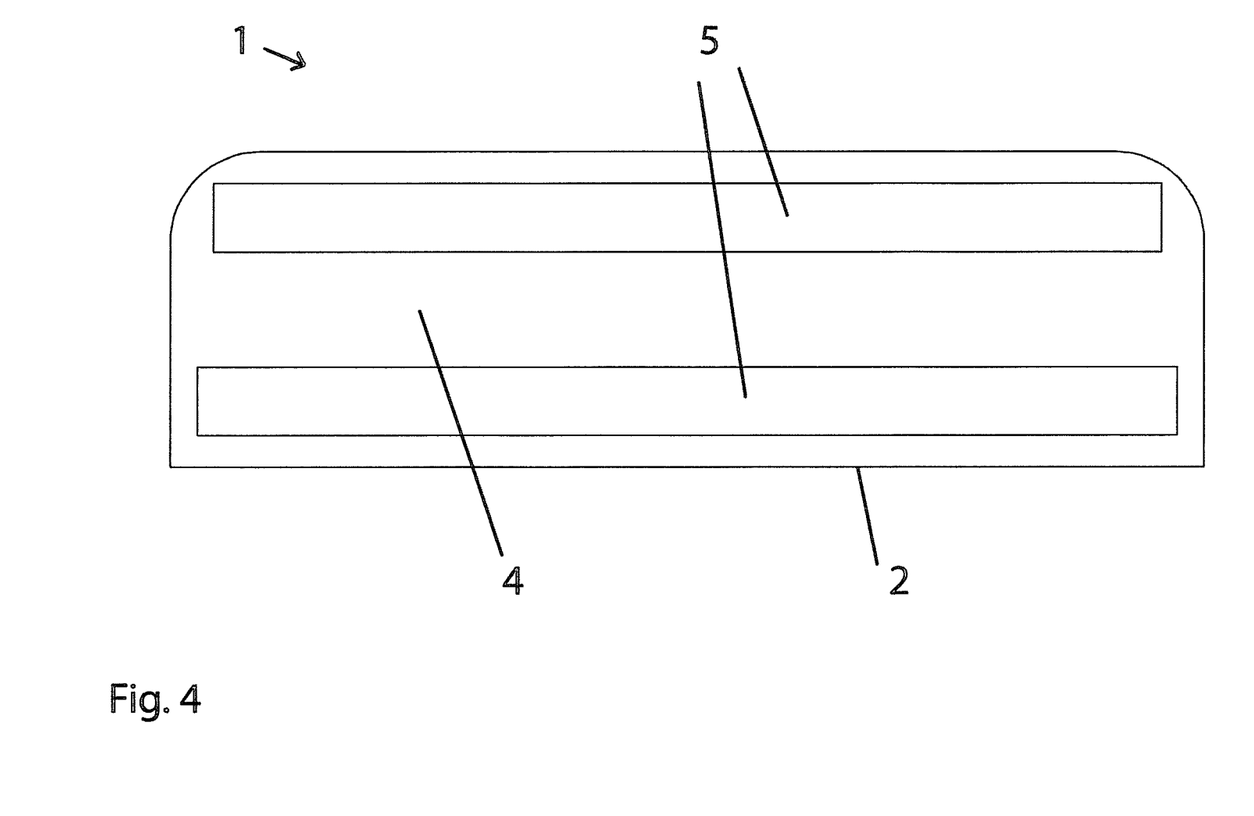
FIG. 4 shows a bottom view of a device for securing items in a cargo area of a car according to the invention.
Figure 5:
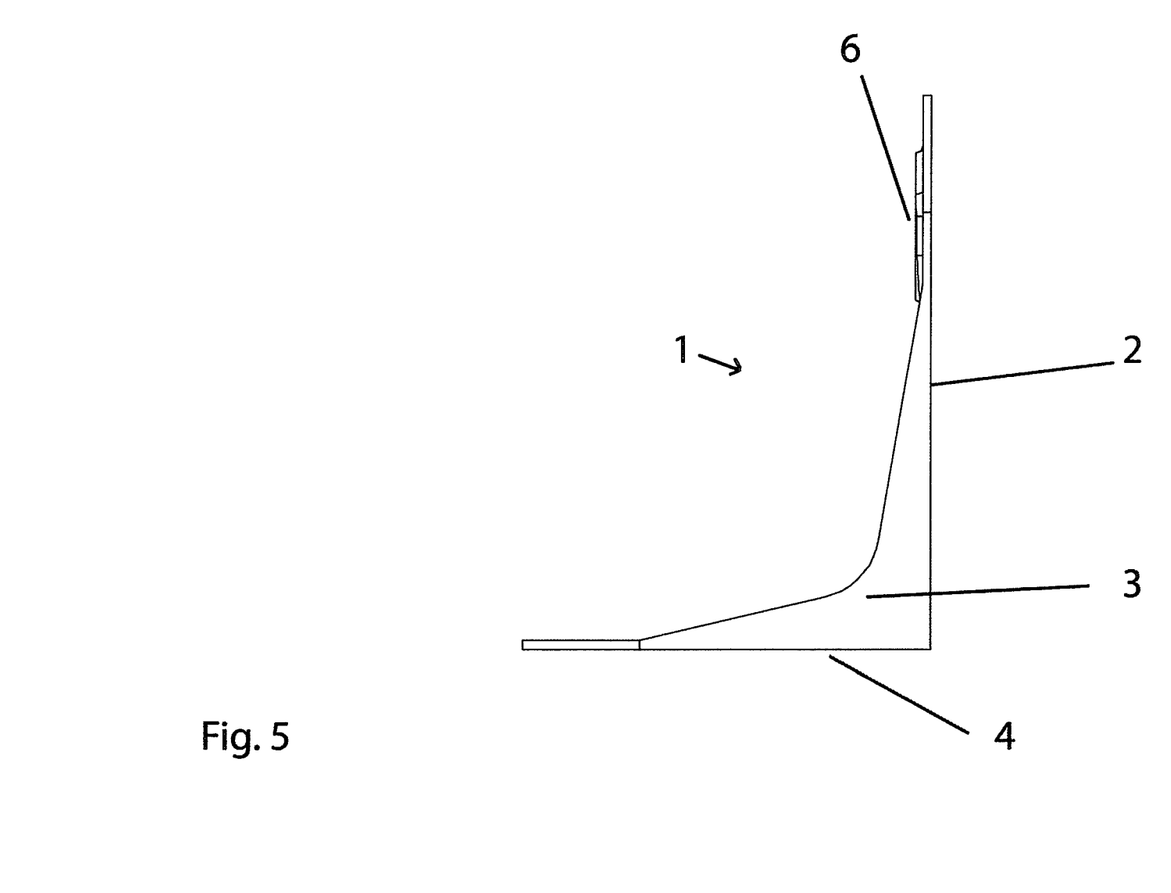
FIG. 5 shows a side view of a device for securing items in a cargo area of a car according to the invention.
Figure 6:
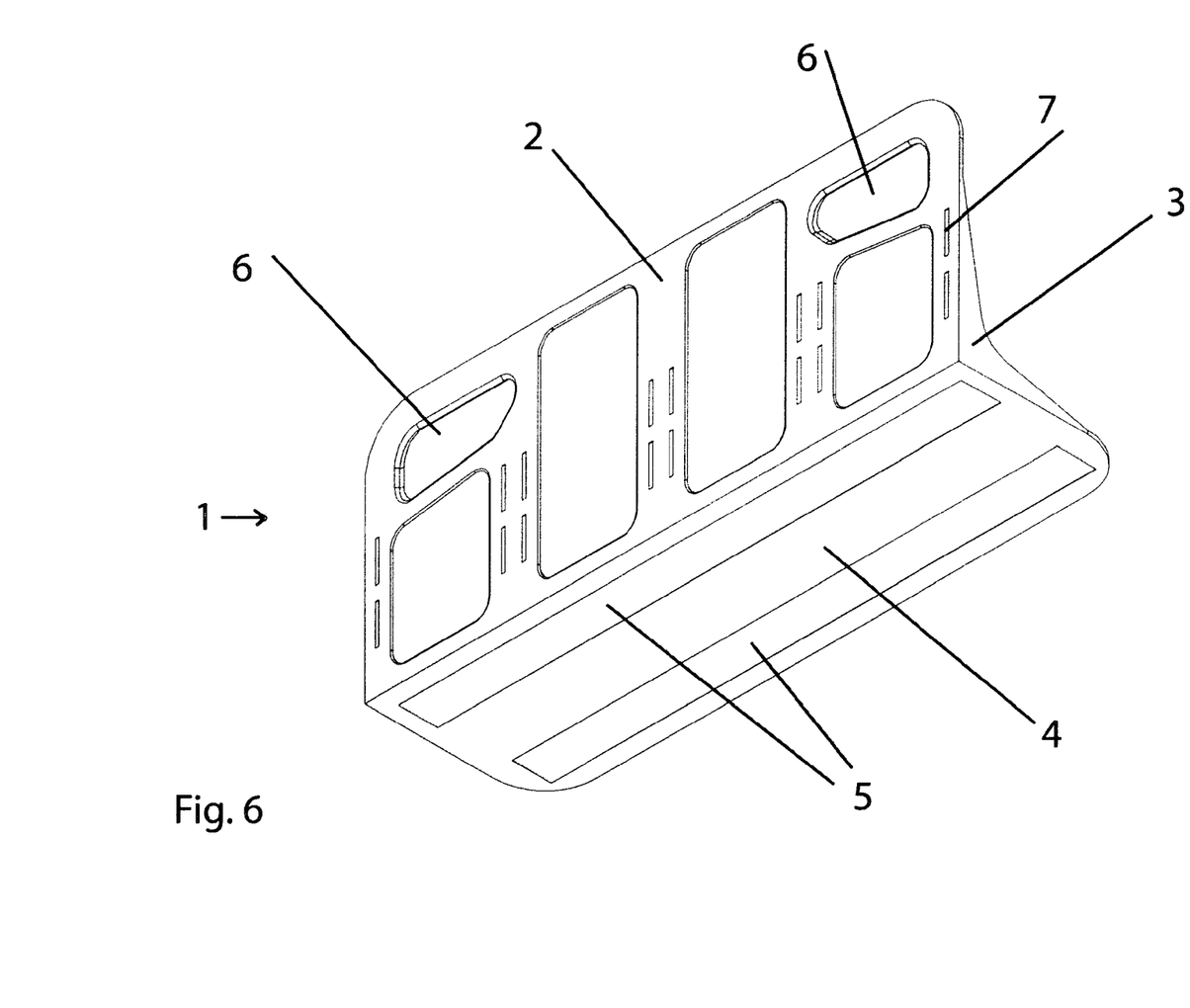
FIG. 6 shows an isometric view from a viewpoint below and to the front of a device for securing items in a cargo area of a car according to the invention.
Figure 7:
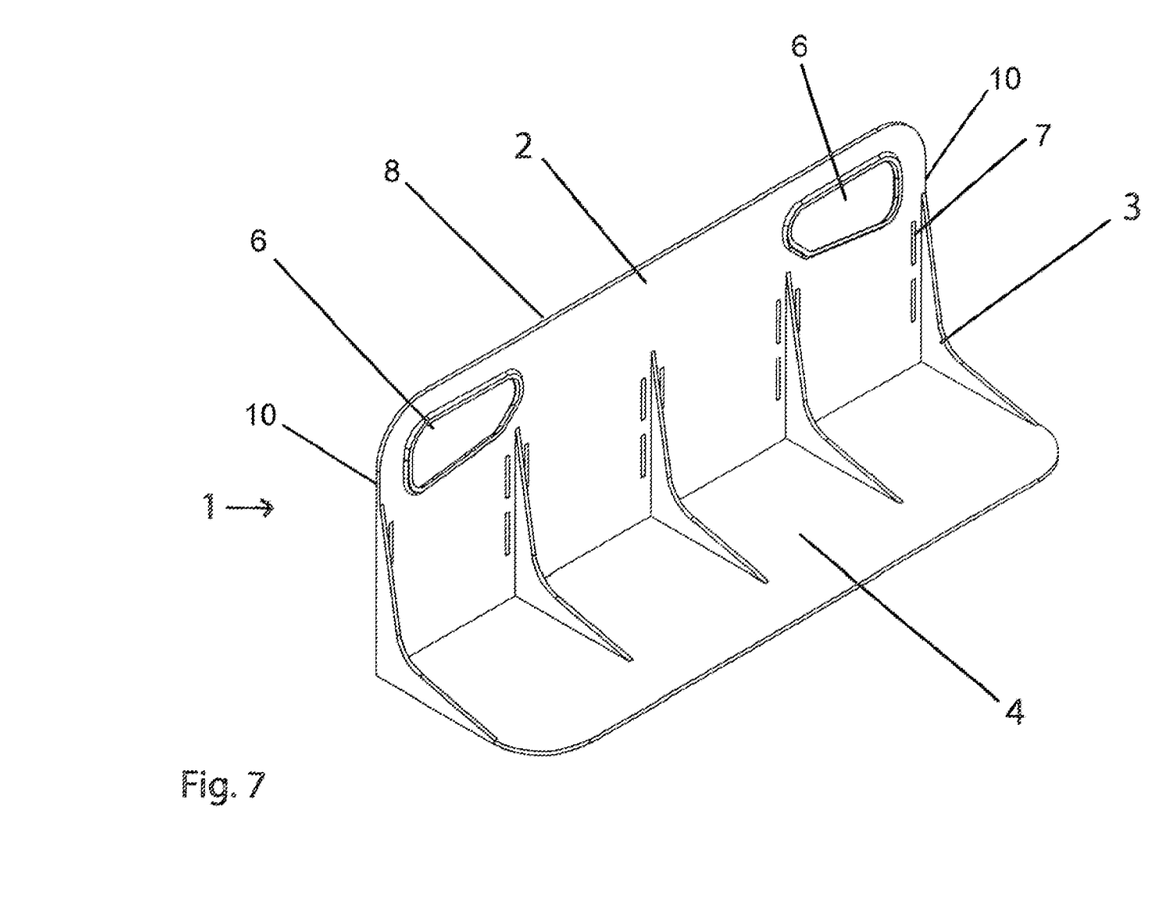
FIG. 7 shows an isometric view from a viewpoint above and to the rear of a device for securing items in a cargo area of a car according to the invention.

Referring now to the drawings, a preferred embodiment of a free standing wall for securing loose items within a cargo area in a vehicle is illustrated in FIGS. 1 to 7. Referring to FIG. 1, a front elevational view the free standing wall apparatus 1 is shown. The free standing wall apparatus 1 includes a front wall 2 preferably constructed from a durable, tough material such as molded plastic or a similar material. The front wall includes a top edge 8, a bottom edge 9, and two opposing side edges 10. In one embodiment, the front wall 2 is solid throughout 5 offering no hollow areas that may be prone to damage. The front extends upward from a ground wall 4, which is connected to the front wall 2 in an L shape (as shown in FIGS. 6 and 7). In a preferred embodiment, the front wall 2 includes one or more handles 6 for gripping the free standing wall apparatus 1. In the illustrated embodiment two handles 6 are present, located at the top of the front wall 2 to facilitate gripping by a user (not shown). In another embodiment, the handles 6 may be formed directly in the front wall 2 by cutting out a portion or portions of the material forming the front wall 2. Also shown in this view are slots 7 formed in the front wall 2. The slots 7 serve as anchoring points for accessories, including straps (not shown) for securing items adjacent the apparatus 1.

Figure 2:
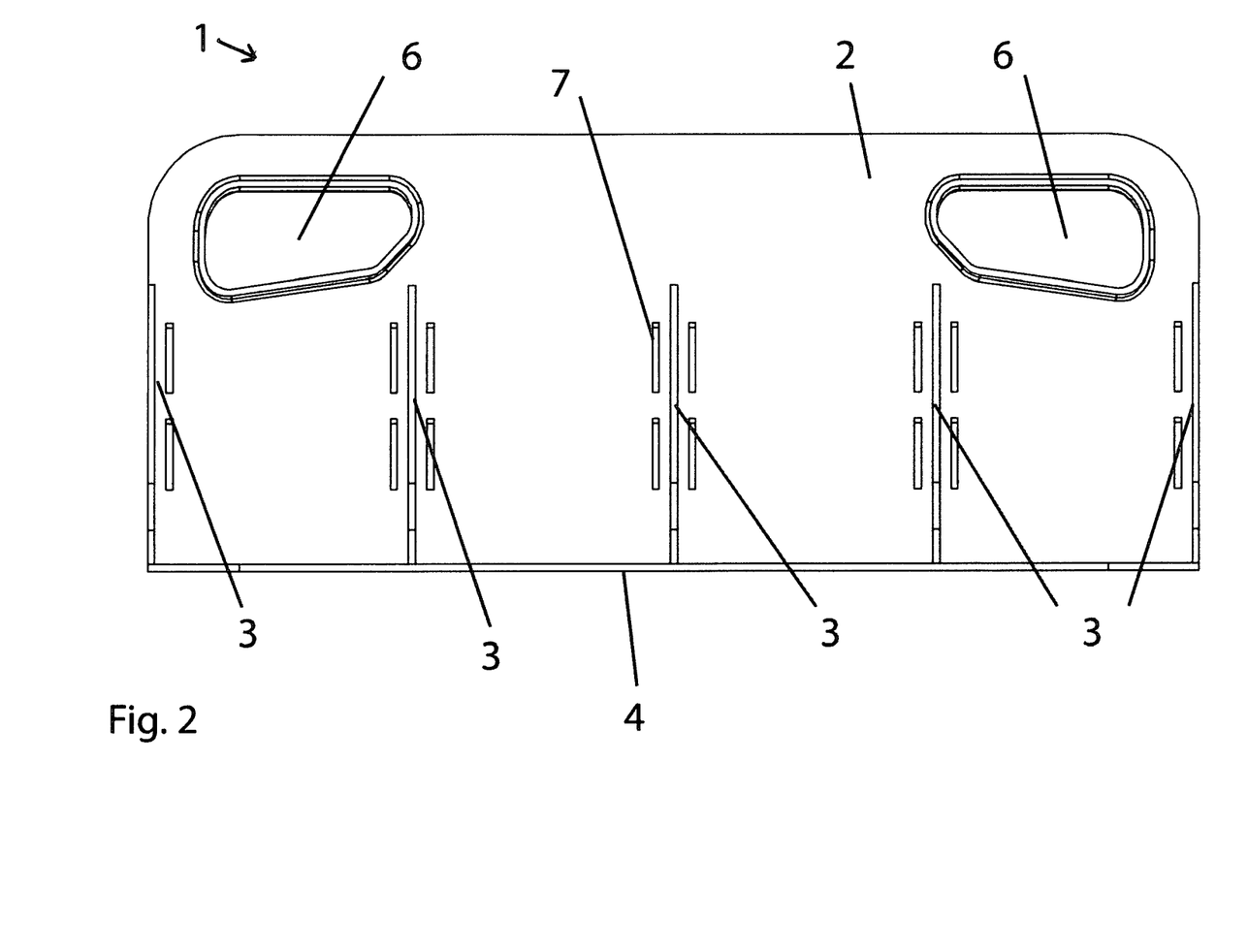
FIG. 2 shows a rear elevational view of a device for securing items in a cargo area of a car according to the invention.

Referring to FIG. 2, a rear elevational view of the free standing wall apparatus 1 is shown. In this view, the front wall 2 is shown having handles 6, and being attached to ground wall 4, and slots 7 in various positions to anchor accessories to the apparatus 1. Also shown in this view are molded plastic ribs 3, which transfer lateral force against the front wall to the ground wall, and connect to the front wall 2 and the ground wall 4 for preserving them in a robust configuration, in a preferred embodiment at substantially ninety degree angles from each other.

Although five molded plastic ribs 3 are shown in the illustrated embodiment, it may be possible to have fewer or more molded plastic ribs 3 as desired. As shown in the exemplary embodiment, two of the ribs 3 may be affixed along side edges of the front wall 2. Additionally, although referred to a molded plastic ribs, they may be comprised of any sturdy, resilient material suitable for preserving the position of the front wall 2 relative to the ground wall 4. Preferably, the slots 7 in the front wall 2 are positioned adjacent the molded plastic ribs 3, thereby ensuring that pressure on the slots 7 caused by accessories won't cause the front wall 2 to move relative to the ground wall 4, which would warp the apparatus 1 out of its normal shape.

Figure 3:
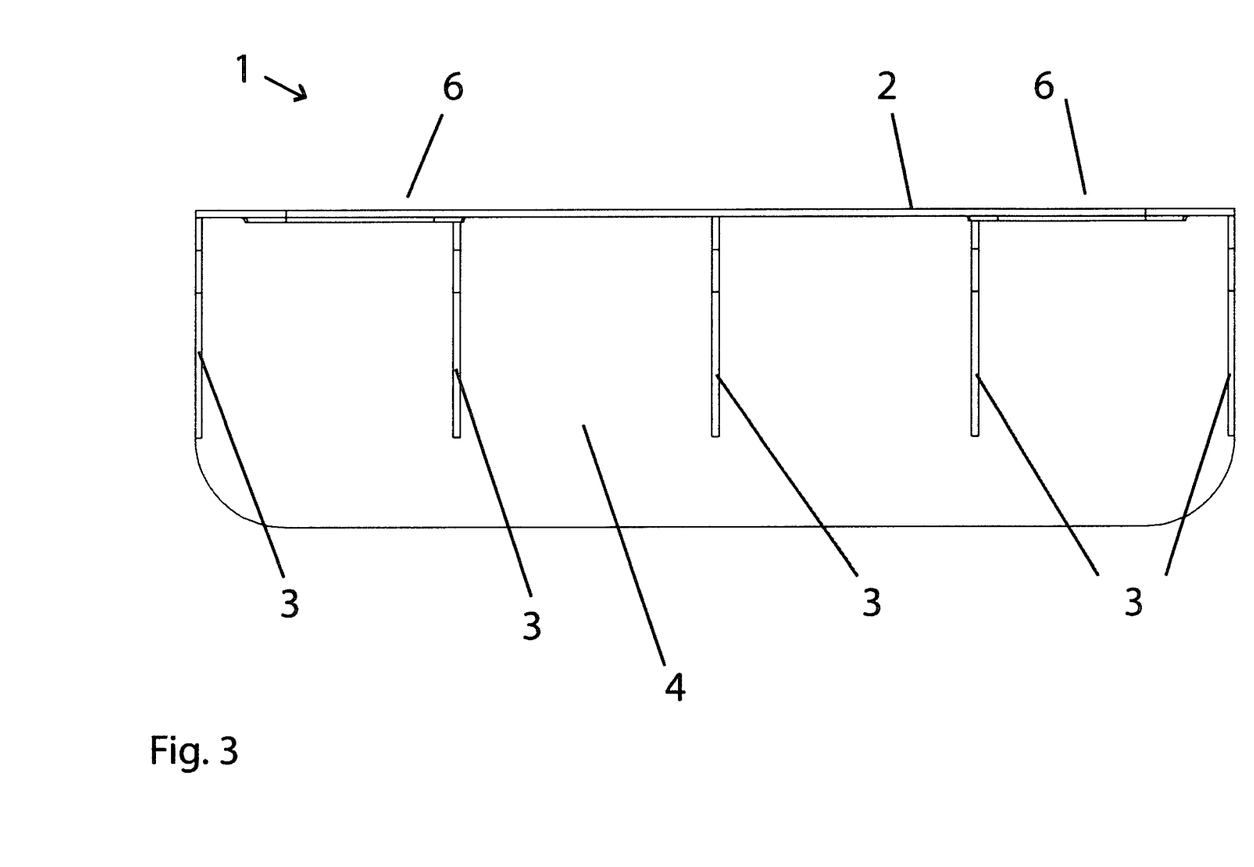
FIG. 3 shows a top plan view of a device for securing items in a cargo area of a car according to the invention.

FIG. 3 shows a top plan view of the free standing wall apparatus 1. In this view the ground wall 4 is shown extending away from the front wall 2, and the molded plastic ribs 3 are shown anchoring them in a substantially ninety degree angle. Also shown in the front wall 2 are the windows 6 which, in the illustrated embodiment, are on opposite ends of the front wall 2. Also in the illustrated embodiments of FIGS. 1, 2, and 3, the front wall 2 is slightly larger than the ground wall 4. However, the ground wall 4 is sufficiently wide to help preserve the apparatus 1 in an upright configuration.

Referring to FIG. 4, a bottom plan view of the free standing wall apparatus 1 is shown. In this view, the bottom of the ground wall 4 is shown adjacent the front wall 2. On a bottom surface of the ground wall 4, a series of anchoring strips 5 are disposed. The anchoring strips 5 are preferably installed across the bottom of the ground wall 4 in a manner covering the ground wall 4 along its length. In the illustrated embodiment, the two anchoring strips 5 are shown. Also in a preferred embodiment, the anchoring strips 5 are attached to the ground wall 4 so that one anchoring strip 5 is proximal the top wall 2 and another anchoring strip 5 is distal from the ground wall 2. In this manner, the anchoring strips 5 provide the best attachment to a surface, preventing the apparatus 1 from tipping under force. The anchoring strips 5 may be made of a complimentary side of a hook an loop fastening material corresponding to the material lining the trunk of a car (not shown), or may be of another material sufficient to anchor the apparatus 1 in position under forces generated during vehicle operation.

Referring to FIG. 5, a side view of the free standing wall apparatus 1 is shown. In this view, one of the molded plastic ribs 3 at the side of the apparatus 1 is prominently shown. The molded plastic ribs 3 preferably extend from the front wall 2 to the ground wall 4 on edge to provide the greatest resiliency against lateral forces acting on the apparatus 1. The molded plastic ribs 3 may also have a profile mimicking the L shape of the apparatus 1 to avoid the molded plastic ribs 3 obstructing the movement of items into and out of a vehicle by a user. In one embodiment, the molded plastic ribs 3 may be located only at the extreme edges of the apparatus 1, although several molded plastic ribs 3 are contemplated.

Referring to FIG. 6, a bottom perspective view of the free standing wall apparatus 1 is shown. From below, the ground wall 4 bearing the anchoring strips 5 is shown ready for anchoring to the cargo area of a vehicle (not shown). The front wall 2 is connected to the ground wall 4 and anchored in position using the molded plastic ribs 3. Also visible on the front wall 2 are the handles 6 and the slots 7. In the illustrated embodiment additional cutouts may be visible on the top wall to decrease the weight of the apparatus 1.

FIG. 7 shows a top perspective view of the free standing wall apparatus 1. In this view the front wall 2, bottom wall 4 and molded plastic ribs 3 are shown, along with the slots 7 adjacent each of the molded plastic ribs 3. The apparatus 1 is oriented as it would appear in the cargo area of a vehicle (not shown). When the anchoring strips (not shown) are adhered to the cargo area of a vehicle, the ground wall 4 is anchored in position. The front wall 2 is also anchored in position due to its attachment to the ground wall 4 and the molded plastic ribs 3. When installed the apparatus 1 will secure loose items. To remove and reinstall the apparatus 1, a user may simply grasp the handles 6 and pull up on the front wall 2, thereby disengaging the anchoring strips.

In one embodiment, the apparatus 1 is one entire solid piece of plastic with the only additions being the long hook and loop anchoring strips 5 adhered to the underside of the ground wall 4 with an adhesive. The anchoring strips 5 fasten and hold in the place the apparatus 1 on the typically carpeted surface found in the cargo area of cars. For this type of use, the anchoring strips 5 are only the hook portion of a hook and loop material, with the carpet acting as the loop material to fulfill the gripping effect. The handles 6 are such situated on either end of the front wall 2 to provide an easy installation and removal experience for the user. When gripping one handle 6 and lifting upwards this will cause one hook and loop anchoring strip to break its' grip with the carpet and allow the apparatus 1 to begin to lift upwards. Due to the continuous anchoring strips 5 creating the grip, as the grip is broken the lifting and peeling effect is steady and constant and means the apparatus 1 can be safely removed without any damage to items enclosed within attached accessories anchored via the slots 7, items against the apparatus 1 or to the user as a result of a sudden release as would be caused if individual and separate sections of anchoring material were used instead of continuous strips.

The foregoing description of the preferred embodiment 10 of the invention is sufficient in detail to enable one skilled in the art to make and use the invention. It is understood, however, that the detail of the preferred embodiment presented is not intended to limit the scope of the invention, in as much as equivalents thereof and other modifications which come within the scope of the invention as defined by the claims will become apparent to those skilled in the art upon reading this specification.

What is claimed is:

1. A freestanding wall device for securing loose items within a cargo area in a vehicle by propping the items against a side wall of said cargo area and securing the items in position, comprising:
   an L shaped cross section molded piece with a vertical wall adjoining the items, the vertical wall having a length more than twice its width, and a horizontal ground wall; integrally molded ribs providing support to said vertical wall by way of transferring force to said ground wall; two continuous strips of hook-and-latch material secured along the underside of the ground wall as a means for gripping to hold said device in position on a carpeted surface; two handles comprising thickened portions of the vertical wall, located at either end of said vertical wall to be used individually and facilitated by said continuous hook-and-latch strips to provide a constant peeling effect when removing said device from said carpeted surface;
   a plurality of ribs, each rib extending only partially across the vertical wall and partially across the horizontal ground wall, each rib being fully connected to the vertical wall and the horizontal ground wall along the length of each rib;
   wherein the front wall comprises opposing rounded corners defining rounded portions of two opposing handle cut-outs proximal the top edge; and
   a top row of elongated vertical slots and a bottom row of equally sized elongated slots, wherein each of the elongated vertical slots of the top row is positioned directly above each of the elongated vertical slots of the bottom row, wherein there are two elongated vertical slots of top and bottom row between adjacent said ribs.

2. A securing device for anchoring items in an automobile trunk, the securing device comprising:
   an elongated rectangular vertical front wall comprising a bottom edge and a top edge having a width, and a first side edge and a second side edge having a height, the width more than twice as long as the height;
   the front wall further comprising rounded corners defining two opposing handle cut-outs proximal the top edge, each handle cut-out sized to receive the four fingers of a user's hand and disposed adjacent an intersection of the top edge and the first side edge, and an intersection of the top edge and the second side edge, respectively;
   a thickened area of the front wall surrounding each handle cut-out;
   a ground wall perpendicular to the front wall, the ground wall sharing the length of the front wall, and the ground wall connected to the front wall continuously along the bottom edge;
   two side ribs oriented perpendicular to the front wall and the ground wall, the two side ribs extending only partially along the opposing first side edges and opposing second side edges, respectively;
   three ribs oriented perpendicular to the front wall and the ground wall, and extending only partially along the front wall and only partially along the ground wall, the ribs evenly disposed along the length between the two side ribs;
   the top edge extending above the ribs; and
   an anchoring strips affixed to the ground wall adjacent the bottom edge, wherein the ribs provide sufficient rigidity such that manipulating the handle cut-outs produces a constant and steady peeling effect when removing the apparatus from a carpeted surface;
   a lower row of elongated vertical slots and an upper row of elongated vertical slots formed in the front wall, wherein all of the elongated vertical slots are located adjacent one of the ribs, and each of the elongated vertical slots of the upper row is disposed directly above each of the elongated vertical slots of the lower row,
   wherein there are two elongated vertical slots of too and bottom row between adjacent said ribs.

3. The device of claim 2 wherein the front wall comprises cut-out sections between the ribs, thereby reducing the weight of the front wall.

4. The device of claim 2 wherein the bottom wall is smaller in plan area than the front wall.

5. The device of claim 2 further comprising a second anchoring strip.

6. The apparatus of claim 5 wherein the anchoring strip and the second anchoring strip comprise hook-and-loop fastening material.

7. The apparatus of claim 5 wherein the anchoring strips are disposed adjacent opposite edges of the bottom wall.

8. The apparatus of claim 2 further comprising curves at the junction of the top edge and the first side edge, and at the junction of the top edge and the second side edge for preventing the front wall from snagging straps and items upon removal, each of the curves conforming to a curve of each of the two handle cut-outs.

* * * * *